(12) United States Patent
Theis

(10) Patent No.: US 10,212,913 B2
(45) Date of Patent: *Feb. 26, 2019

(54) TEAT CUP CLEANING UNIT COMPRISING A DISTRIBUTION UNIT

(71) Applicant: GEA Farm Technologies GmbH, Bönen (DE)

(72) Inventor: Christelle Theis, Iserlohn (DE)

(73) Assignee: GEA Farm Technologies GmbH, Bönen (DE)

( * ) Notice: Subject to any disclaimer, the term of this patent is extended or adjusted under 35 U.S.C. 154(b) by 148 days.

This patent is subject to a terminal disclaimer.

(21) Appl. No.: 15/135,799

(22) Filed: Apr. 22, 2016

(65) Prior Publication Data

US 2016/0235031 A1    Aug. 18, 2016

Related U.S. Application Data

(63) Continuation of application No. 12/998,462, filed as application No. PCT/EP2009/064890 on Nov. 10, 2009, now Pat. No. 9,320,254.

(30) Foreign Application Priority Data

Nov. 10, 2008 (DE) .......................... 10 2008 056 543

(51) Int. Cl.
*A01J 7/02* (2006.01)
*B08B 9/08* (2006.01)
*B08B 13/00* (2006.01)

(52) U.S. Cl.
CPC ............. *A01J 7/025* (2013.01); *B08B 9/0804* (2013.01); *B08B 13/00* (2013.01)

(58) Field of Classification Search
CPC ....................................................... A01J 7/025
See application file for complete search history.

(56) References Cited

U.S. PATENT DOCUMENTS

| 3,834,407 A | * | 9/1974 | Heitman | .................. | A01J 7/025 134/171 |
| 4,854,336 A | * | 8/1989 | Byzitter | .................. | A01J 7/025 134/104.1 |
| 7,814,940 B2 | * | 10/2010 | Till | ........................... | A61L 2/22 141/11 |

(Continued)

FOREIGN PATENT DOCUMENTS

| DE | 102006053602 | 5/2008 |
| EP | 0852905 | 7/1998 |

(Continued)

OTHER PUBLICATIONS

Int'l Search Report and Whitten Opinion from PCT/EP09/064890 dated Feb. 8, 2011, 7 pages.

*Primary Examiner* — Spencer E Bell
(74) *Attorney, Agent, or Firm* — Smith Law Office; Jeffry W. Smith

(57) ABSTRACT

The invention relates to a teat cup cleaning unit comprising a distribution unit which has an inlet and at least two outlets for a cleaning liquid. The distribution unit has a calming chamber and a distribution chamber. The calming chamber is connected to the distribution chamber via an opening. The inlet opens into the calming chamber. A cleaning liquid leaves the distribution chamber through the passages leading to the outlets.

10 Claims, 3 Drawing Sheets

(56) References Cited

U.S. PATENT DOCUMENTS

2008/0110883 A1* 5/2008 Vetter ................ B08L 39/0936
                                                    220/87.1

FOREIGN PATENT DOCUMENTS

| GB | 2097891 | 11/1982 |
|---|---|---|
| NZ | 260183 | 10/1996 |
| WO | 00/076301 | 12/2000 |
| WO | 03/077645 | 9/2003 |
| WO | 03/086054 | 10/2003 |
| WO | 08/058723 | 5/2008 |

* cited by examiner

TEAT CUP CLEANING UNIT COMPRISING A DISTRIBUTION UNIT

CROSS REFERENCE TO RELATED APPLICATIONS

This application is a continuation of U.S. application Ser. No. 12/998,462, filed Apr. 22, 2011, which is a national phase application under 35 U.S.C. § 371 of PCT International Application No. PCT/EP2009/064890, filed Nov. 10, 2009, which claims priority to German Application No. 10 2008 056 543.1 filed Nov. 10, 2008, the disclosures of which are incorporated by reference herein.

BACKGROUND OF THE INVENTION

The subject matter of the invention relates to a teat cup cleaning unit comprising a distribution unit.

Raw milk is an important food and is an important raw material for the food industry. In order to protect the consumer and for the purposes of technical processibility, milk has to meet both national and international quality requirements. In the Federal Republic of Germany, according to § 3 of the Milk Regulations, raw milk must not have any abnormal sensory features, and therefore, according to Annex 3 of the Milk Regulations, the udder of animals from which milk is obtained as a food has to be cleaned at the start of a milking operation. Cleaning in this case must be thorough and complete.

It is important to maintain prescribed standards of hygiene in order to ensure high quality of the milk. It is therefore not only necessary to clean the udder and the teats of the animal but also the components of a milking system. The cleaning may also include disinfection of the components of the milking system. The cleaning operation may be carried out by means of a fluid, in particular by means of water, with and without cleaning, disinfecting or other additives. In particular, the teat cup cluster must be cleaned of milk residues and disinfected. The teat cup cluster does not have to be disinfected during each cleaning operation. The cleaning operation may take place after each milking operation or after a certain number of milking operations.

It is known that, after each cow has been milked, the milk cup cluster is cleaned by means of water, a disinfection solution and water again and is optionally dried with compressed air. This involves what is referred to as intermediate cleaning.

For the purpose of cleaning the teat cup cluster, in particular the individual teat cups, the teat cups are connected to a teat cup cleaning unit. The teat cup cleaning unit may have holders used to hold the teat cup cluster on the cleaning unit. It is known that the teat cup cleaning unit has a distribution unit. The distribution unit has an inlet and at least two outlets for a cleaning liquid. The number of outlets depends on the number of teat cups to be cleaned. If, for example, the teat cup cluster used to milk cows is cleaned, four outlets are correspondingly provided for a cleaning liquid. The cleaning liquid flows through the inlet, the distribution unit and from the latter via the outlets into the teat cups.

For example, WO 2008/058723 discloses a cleaning system for teat cups, the cleaning system having a holder for receiving at least part of a teat cup, said part containing an opening for the insertion of a teat. The cleaning system furthermore has a fluid dispensing device which is designed in such a manner that a first cleaning fluid can pass into the opening from a first fluid source and a second cleaning fluid from a fluid source.

Another exemplary embodiment of a teat cup cleaning unit is described in WO 03/077645. Said teat cup cleaning unit is designed in such a manner that cleaning fluid is conducted via a line into the teat cup.

WO 03/086054 A1 discloses a teat cup cleaning unit comprising a distribution unit. The distribution unit has an inlet and two outlets for a cleaning liquid. The inlet is connected to a line through which a cleaning agent flows. For this purpose, a formed, tubular part projects into the line. An internal thread is provided in the tubular part. A distributor which is of hollow design and has lateral openings is screwed into the thread. The lateral openings can be brought to coincide with openings in the tubular part. By means of the position of the insert within the tubular part, the entire opening cross section can be changed, and therefore the quantity of liquid flowing through the inlet can be set.

A further embodiment of a teat cup cleaning unit comprising a distribution unit is disclosed by WO 00/76301. Despite a setting element, the flow through the distribution unit may be changed.

Another embodiment of a teat cup cleaning unit comprising a distribution unit is disclosed by GB 20 97 891. The distribution unit has a chamber with an inlet and four outlets. The cleaning liquid passes through the inlet into the chamber and leaves the latter via the four outlets. The inlet into the chamber is provided with a valve which is formed such that a cross section of the inlet can be changed.

A comparable configuration of a teat cup cleaning unit is also disclosed by the document NZ 270 183 A.

A problem of a teat cup cleaning unit comprising a distribution unit is that a satisfactory result of cleaning all of the teat cups is associated with a considerable consumption of cleaning agent.

SUMMARY OF THE INVENTION

Taking this as the starting point, the present invention is based on the object of developing the known teat cup cleaning unit in such a manner that an improved cleaning result is achieved.

This object is achieved according to the invention by a teat cup cleaning unit with the features of claim 1. Advantageous developments and refinements of the teat cup cleaning unit are the subject matter of the dependent claims.

The teat cup cleaning unit according to the invention comprising a distribution unit which has an inlet and at least two outlets for a cleaning liquid is distinguished in that the distribution unit has a calming chamber and a distribution chamber. The calming chamber is connected to the distribution chamber via an opening. The calming chamber has an inlet and the distribution chamber has the at least two outlets.

An improved cleaning result is achieved by this refinement according to the invention of the teat cup cleaning unit. Owing to the fact that the cleaning liquid flows into the calming chamber and overflows therefrom into the distribution chamber, from where said cleaning liquid leaves via the outlets of the distribution chamber, an improved flow behavior of the cleaning liquid is achieved. In particular, the flow is first of all calmed in the calming chamber and is evened out even further in the distribution chamber, thus also resulting in a uniform distribution of the liquid to the at least two outlets. Owing to the fact that an improved cleaning result is achieved by evening out the flow, it is possible to reduce the consumption of cleaning liquid, since an equivalent cleaning result is achieved with a lower quantity of cleaning liquid.

A preferred refinement of the teat cup cleaning unit is distinguished in that the chambers are arranged substantially one above the other. This results in a compact construction of the teat cup cleaning unit.

In order to improve the cleaning result even further, it is proposed, according to another advantageous refinement of the teat cup cleaning unit according to the invention, that the latter is designed in such a manner that the lengths of each flow path of a cleaning liquid from the opening to the particular outlet are substantially identical. Evening out of the distribution of liquid to the outlets is thereby improved even further.

According to an advantageous refinement of the teat cup cleaning unit, it is proposed that the chambers are formed in a preferably two-part housing. This results in simplified production of the teat cup cleaning unit.

A refinement is particularly preferred, in which the housing is formed substantially symmetrically with respect to at least one plane. Such a refinement of the teat cup cleaning unit is advantageous in particular if the housing is at least partially formed from at least one plastic. The housing may be produced as a molded part. The respective housing halves, which form joints, may be provided with corresponding grooves into which a seal is inserted such that a liquid-tight connection between the housing halves is achieved.

According to yet another advantageous refinement of the invention, it is proposed that the inlet is provided with a valve. This makes it possible to adapt the volumetric flow of a cleaning liquid into the teat cup cleaning unit.

A refinement of the teat cup cleaning unit is particularly preferred, in which the calming chamber has a wall running obliquely substantially opposite the inlet. The obliquely running wall serves as a flow limit for the cleaning liquid shooting or flowing into the calming chamber. If the cleaning liquid flows through the inlet into the calming chamber, it strikes against the obliquely running wall. As a result, the liquid flow is calmed.

To calm the liquid flowing into the calming chamber even further, it is proposed, according to yet another advantageous refinement of the teat cup cleaning unit, that the free flow cross section in the calming chamber decreases from the inlet toward the opening.

According to an advantageous refinement of the teat cup cleaning unit, it is proposed that the opening through which the cleaning liquid passes from the calming chamber into the distribution chamber is arranged in such a manner that said opening is located substantially above the inlet with respect to a horizontal plane. This ensures that above a certain liquid level in the calming chamber, the liquid flows through the opening into the distribution chamber.

After the ending of the cleaning or of a cleaning step in which the cleaning liquid flows through the distribution unit, it is proposed that the liquid can flow back out of the distribution unit via the inlet. For this purpose, the distribution unit is preferably arranged in such a manner that, in the fitted state of the teat cup cleaning unit, there is a slope from the opening to the inlet and/or from the outlet to the opening.

Said slope can also be achieved by the wall of the distribution chamber or of the calming chamber being appropriately formed.

If the distribution unit is fitted with a slope, the angle of installation is preferably 3°.

Further advantages and details of the teat cup cleaning unit according to the invention are explained with reference to a preferred exemplary embodiment without the subject matter of the invention being restricted to said specific exemplary embodiment.

DETAILED DESCRIPTION OF THE INVENTION

Figure 1:
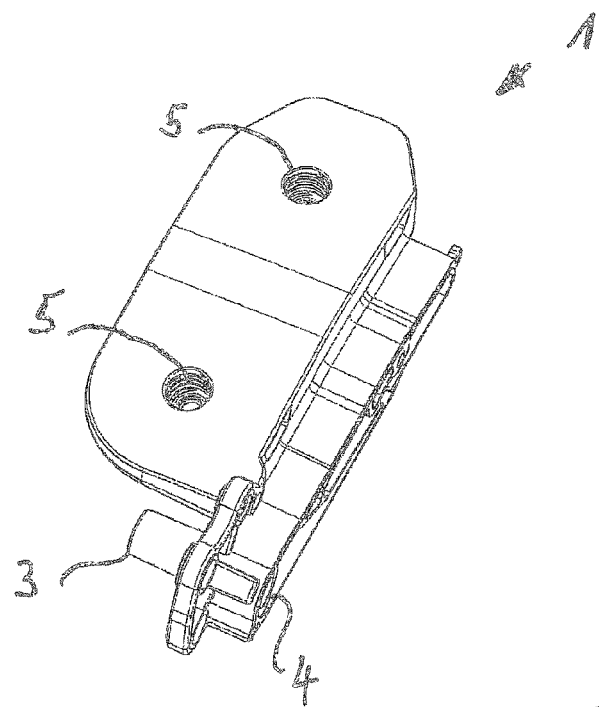
FIG. 1 shows a left part of a teat cup cleaning unit in a perspective view.
Figure 3:
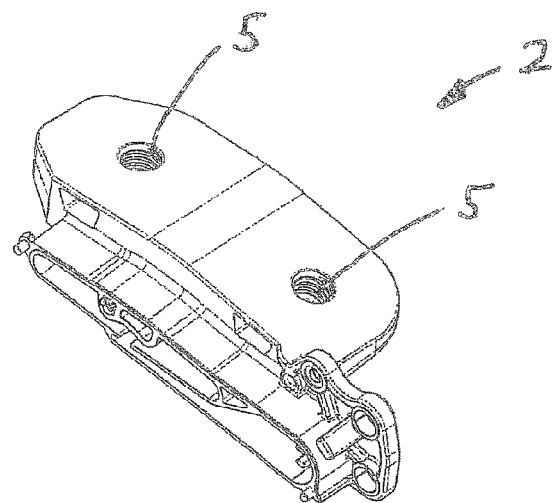
FIG. 3 shows the right part of a teat cup cleaning unit in a perspective view.
Figure 5:
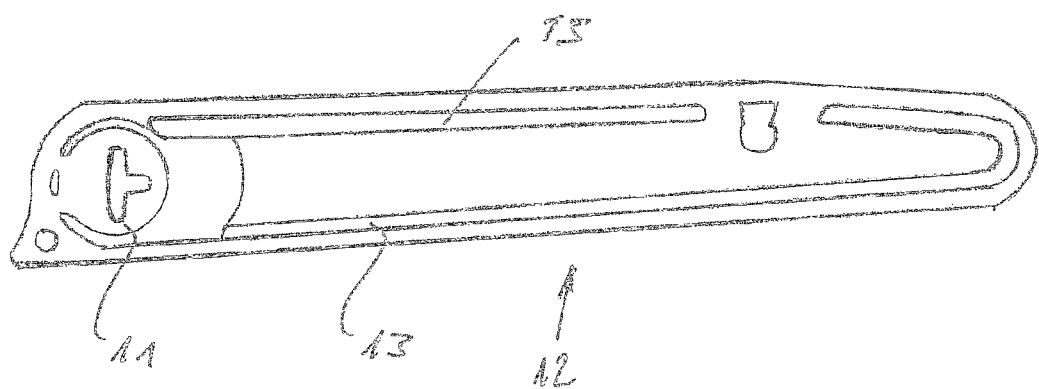
FIG. 5 shows a sealing element in a side view.

FIGS. 1 and 3 show a left part 1 and right part 2 of a teat cup cleaning unit in a perspective view. The parts 1 and 2 can be connected to each other on the end side, thus producing a teat cup cleaning unit. A seal, as illustrated in FIG. 5, can be inserted between the parts, permitting an air-tight connection of the parts 1 and 2. The parts form a common housing which is formed substantially symmetrically. The housing consists of a plastic.

It is apparent from the illustration according to FIG. 1 that a connecting piece 3 is provided. The connecting piece 3 opens into an inlet 4.

FIGS. 1 and 3 show that the teat cup cleaning unit 4 has outlets 5. The outlets 5 are formed by openings which, in the exemplary embodiment illustrated, have internal threads. The internal threads serve for connection to flow conducting means and optionally holders which may be used to secure teat cups to the teat cup cleaning unit.

The teat cup cleaning unit has a calming chamber 6. The inlet 4 opens into the calming chamber 6. In the exemplary embodiment illustrated, the calming chamber 6 is tapered.

Figure 2:
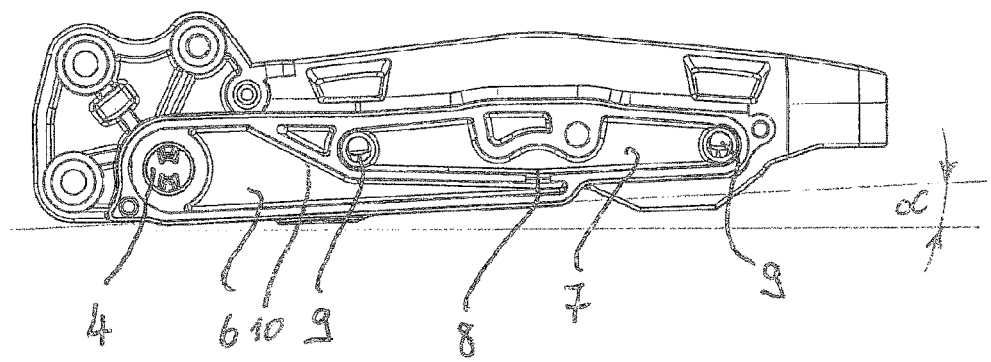
FIG. 2 shows the left part of the teat cup cleaning unit in a front view.
Figure 4:
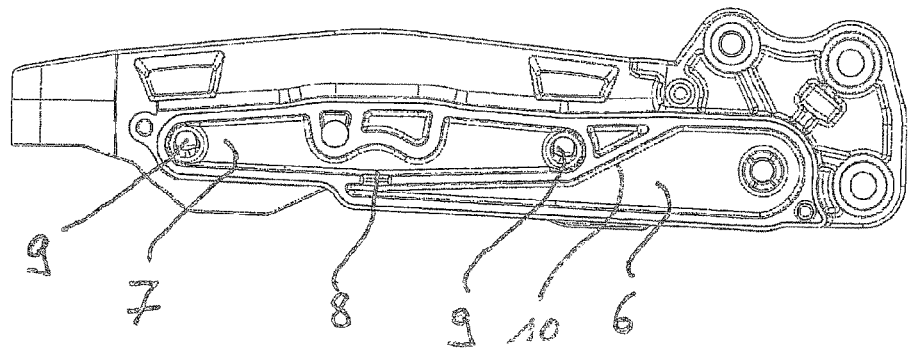
FIG. 4 shows the front view of the part according to FIG. 3.

It is apparent from the illustration according to FIGS. 2 and 4 that the calming chamber 6 has a wall 10 which is designed such that the flowing liquid flows from the inlet towards the obliquely running wall 10. The chamber has a region which is adjacent to the inlet 4 and has a constant cross section which merges into a tapering cross section. This is adjoined by yet another, but no longer so severe, reduction in the flow cross section. It is not compulsory for a cross-sectional change in the free flow cross section to be discontinuous. Refinements are also possible in which the flow cross section decreases continuously.

The teat cup cleaning unit has a distribution chamber 7. The calming chamber 6 and the distribution chamber 7 are connected to each other via an opening 8. In the exemplary embodiment illustrated, the dividing plane passes through the opening 8. The opening 8 is formed in a region of the calming chamber 6 opposite the inlet 4. As is apparent from the illustration in FIG. 2 and FIG. 4, the opening 8 is located in a region of the chamber 6 in which said chamber has a relatively small free flow cross section.

The outlets 5 are connected to the distribution chamber 7 via passages 9.

A cleaning liquid flows through the inlet 4 into the calming chamber 6. The cleaning liquid flows from the calming chamber 6 via the opening 8 into the distribution chamber 7. The cleaning liquid leaves the teat cup cleaning unit via the passages 9 and the outlets 5. The lengths of each flow path of a cleaning liquid from the opening 8 to the particular outlet 5 are substantially identical. This permits a uniform distribution of a cleaning liquid. The calming chamber 6 has the task of calming the cleaning liquid flowing into the chamber in order to permit a uniform distribution of the cleaning liquid to the outlets 5.

The inlet 4 or the connecting piece 3 can be provided with a valve by means of which the flow cross section of the inlet can be changed. A pivotable disk 11 can be provided in the region of the inlet 4. Said disk forms a non return valve which prevents air from being sucked into the rinsing line if there is a vacuum there but a teat cup cluster is not connected to the teat cup cleaning unit. The inlet or the connecting piece of the inlet may have a contour which accommodates the valve. The valve may be designed as a separate component. Connecting means, by means of which the parts 1 and 2 can be connected to each other, are not illustrated. Centering means may also be provided on the parts so as to simplify installation of the parts.

FIG. 5 illustrates a seal 12 which is arranged between the parts 1 and 2 of the distribution unit. The parts 1 and 2 are connected to each other by connecting means such that an air-tight connection is achieved with the assistance of the seal 12. The seal 12 has beads 13 which can be introduced into corresponding grooves of the parts 1, 2.

The seal 12 has a disk 11 which can be deflected. The disk 11 is connected in an articulated manner to the seal 12 such that the latter can be deflected into the plane of the drawing or out of the latter.

The refinement according to the invention of the teat cup cleaning unit permits a cleaning liquid to be evenly distributed to the outlets. This improves the cleaning of the teat cups. A saving of cleaning liquids can occur.

The invention claimed is:

1. A teat cup cleaning distribution unit for cleaning a plurality of teat cups, the teat cup cleaning distribution unit comprising:
    a housing defining:
        a calming chamber having a calming chamber inlet, a calming chamber outlet, and an oblique wall that at least partially defines a calming chamber cross section that is at least partially tapered along a longitudinal axis from a larger cross section at the calming chamber inlet toward a smaller cross section at the calming chamber outlet, and the calming chamber inlet and the calming chamber outlet are substantially perpendicular to the longitudinal axis; and
        a distribution chamber in communication with the calming chamber outlet and with a plurality of distribution chamber passages, and each distribution chamber passage is substantially identical in length and is in fluid communication with a respective distribution chamber outlet, and the calming chamber outlet is substantially perpendicular to each distribution chamber passage.

2. The teat cup cleaning distribution unit of claim 1, wherein flow paths from the calming chamber inlet to each of the passages are substantially identical in length.

3. The teat cup cleaning distribution unit of claim 1, wherein flow paths from the calming chamber outlet to each of the distribution chamber passages are substantially identical in length.

4. The teat cup cleaning distribution unit of claim 1, wherein the calming chamber is disposed below the distribution chamber when in use.

5. The teat cup cleaning distribution unit of claim 1, wherein the calming chamber defines a flow path from the calming chamber inlet to the calming chamber outlet, and the calming chamber inlet is oriented transversely to the flow path.

6. The teat cup cleaning distribution unit of claim 1, wherein the calming chamber inlet is oriented substantially perpendicular to the calming chamber outlet.

7. The teat cup cleaning distribution unit of claim 1, wherein the oblique wall at least partially defines a flow path through the calming chamber.

8. The teat cup cleaning distribution unit of claim 1, wherein a flow path extends between the calming chamber inlet and the calming chamber outlet, and the calming chamber inlet is oriented substantially perpendicular to the flow path and the calming chamber outlet.

9. The teat cup cleaning distribution unit of claim 1, and further comprising:
    a valve disposed in the calming chamber inlet.

10. The teat cup cleaning distribution unit of claim 1, wherein the calming chamber cross section includes a constant cross section adjacent to the calming chamber inlet that merges with a tapered cross section.

* * * * *